Sept. 15, 1931.　　　　R. VON REPPERT　　　　1,823,715
COMBINED TYPEWRITING AND COMPUTING MACHINE
Filed March 24, 1926　　7 Sheets-Sheet 2

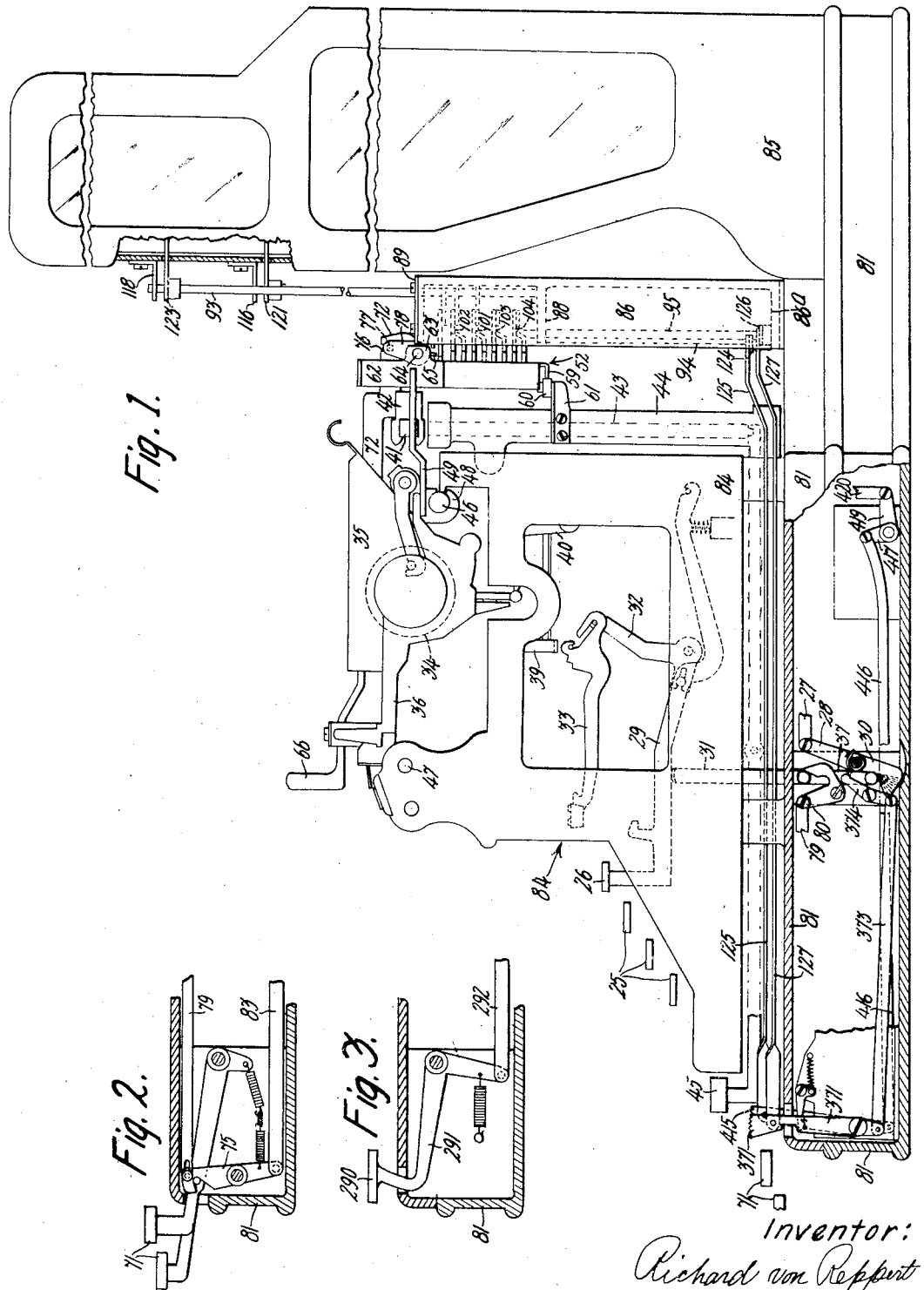

PLAN

Inventor:
Richard von Reppert
by D C Stickney
Attorney

Sept. 15, 1931. R. VON REPPERT 1,823,715
COMBINED TYPEWRITING AND COMPUTING MACHINE
Filed March 24, 1926 7 Sheets-Sheet 3

Inventor:
Richard von Reppert
by B.C. Stickney
Attorney

Sept. 15, 1931.　　　　　R. VON REPPERT　　　　　1,823,715
COMBINED TYPEWRITING AND COMPUTING MACHINE
Filed March 24, 1926　　　7 Sheets-Sheet 4

FRONT VIEW

PLAN

Inventor:
Richard von Reppert
by O C Stickney
Attorney

Sept. 15, 1931.  R. VON REPPERT  1,823,715
COMBINED TYPEWRITING AND COMPUTING MACHINE
Filed March 24, 1926  7 Sheets-Sheet 5
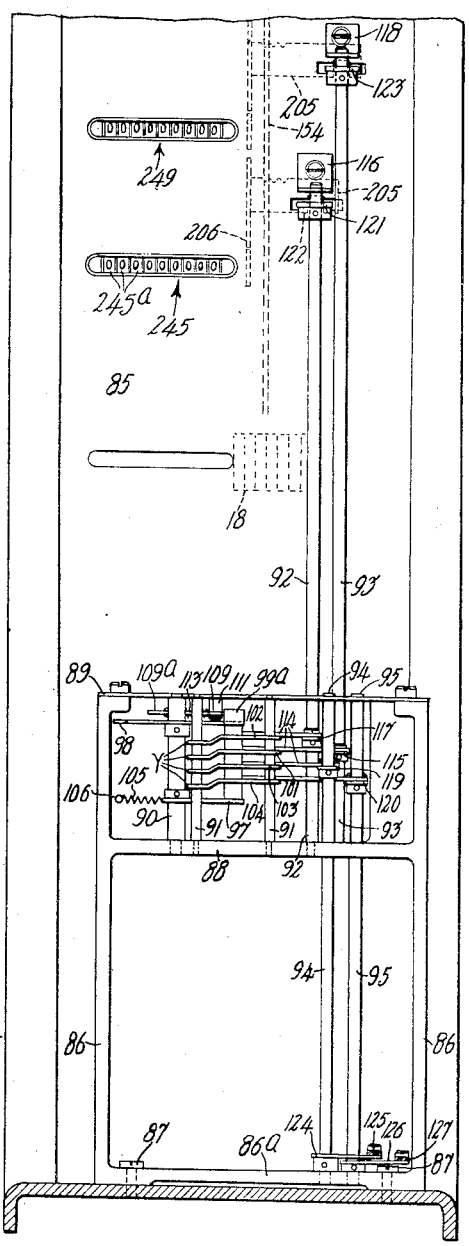
Fig. 8.
FRONT VIEW
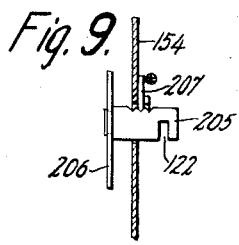
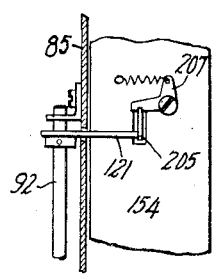
Inventor:
Richard von Reppert
by DC Stickney
Attorney

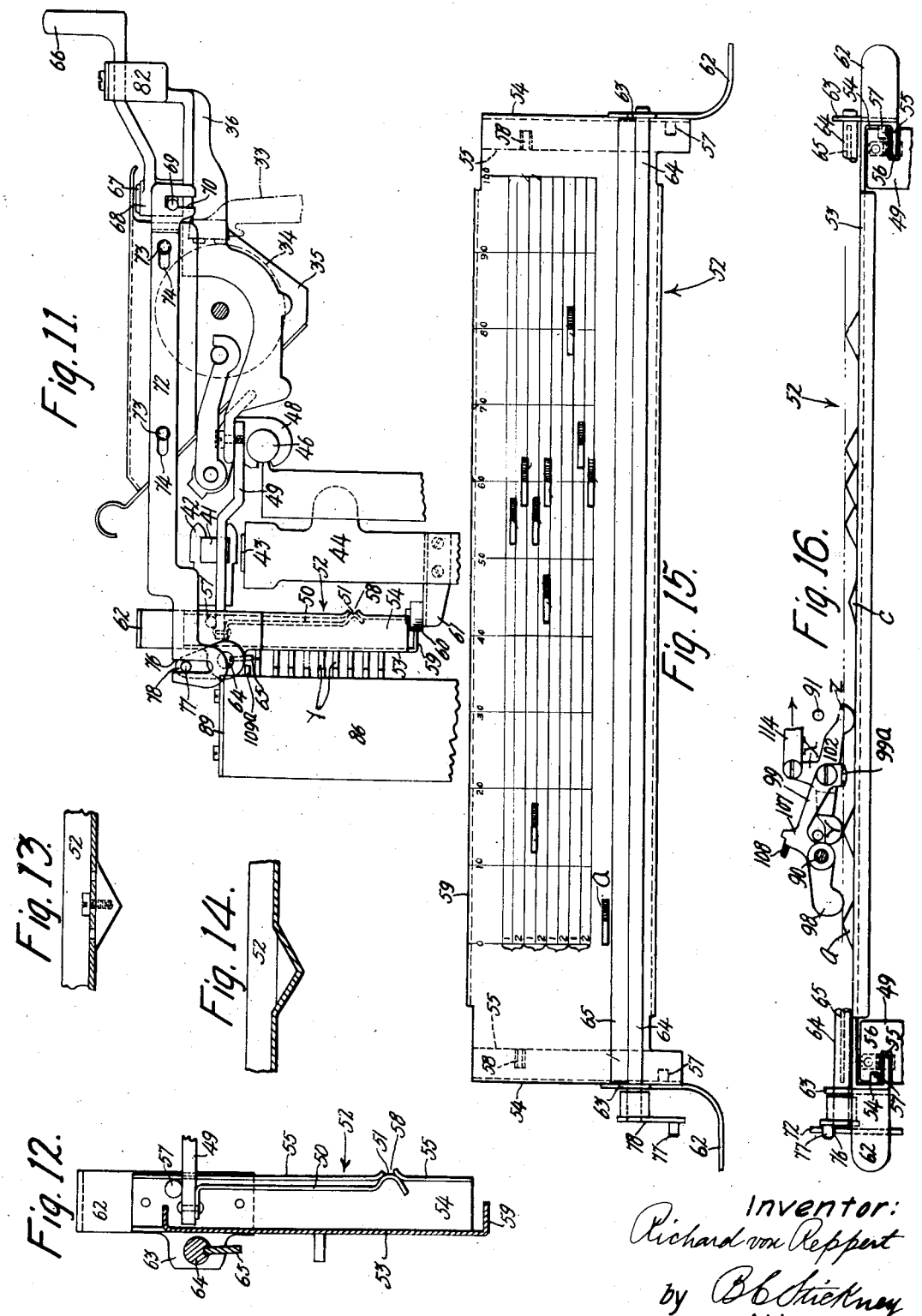

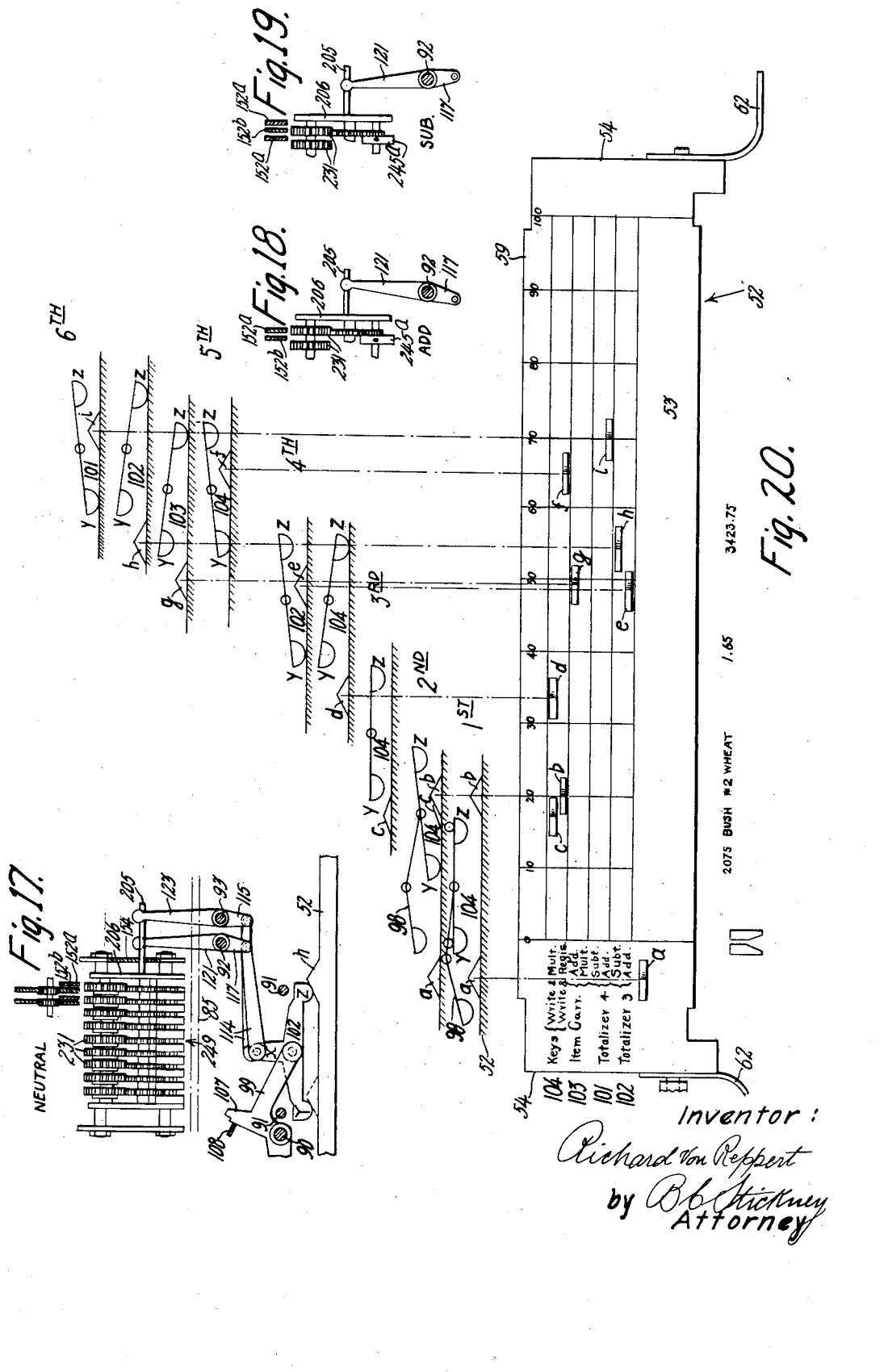

Patented Sept. 15, 1931

1,823,715

UNITED STATES PATENT OFFICE

RICHARD von REPPERT, OF HARTFORD, CONNECTICUT, ASSIGNOR, BY MESNE ASSIGNMENTS, TO ELLIOTT-FISHER COMPANY, OF NEW YORK, N. Y., A CORPORATION OF DELAWARE

COMBINED TYPEWRITING AND COMPUTING MACHINE

Application filed March 24, 1926. Serial No. 96,969.

This invention relates to a combined typewriting and computing machine, and may be regarded as an improvement on my prior Patent No. 1,302,250, dated April 29, 1919, where typewriting elements may be used separately or be operatively connected to simultaneously print and actuate calculating devices, whereby addition, subtraction or multiplication may be simultaneously effected, and a visual display of the results shown on the various totalizers.

In my prior patent referred to, a number of totalizers are provided, and are manually settable from ineffective or neutral position to either adding or subtracting position, and the numeral-keys of the typewriter are arranged to be manually connected to type, and, simultaneously therewith, set up or enter the typed item in an item-register, or be actuated to type, and, simultaneously therewith, actuate the multiplying devices, to multiply with the item that is being typewritten. A machine of this type is particularly adapted for billing, and, in the course of a single lineal computation, such as an invoice item, the typewriter numeral-keys are employed in various capacities, such as writing the quantity of articles, the price of the articles, and the product total of the quantity multiplied by the price. Furthermore, a machine of this character is not permanently set for the same particular printed form, where computations for totals, sub-totals, grand totals or any other computations can only be repeatedly entered within fixed columns, but the forms may vary, and the assignment of the totalizing elements to the columns of the printed form may vary accordingly; and a final computation, that includes a prior computation that involves multiplication or subtraction, that in one form may be entered in one column thereof, may in another form have a different column-position assigned for the totalizer. A manual control-lever for the typewriter numeral-keys is provided and at a middle stop-position indicates a "write" control, where the computing elements remain inactive during the typing operation; a rearward shift of this lever establishes connection to "write and register", where typed values are simultaneously conveyed to the registering elements; and the forward shift movement of said lever establishes other connections to "write and multiply", where the item represents the multiplier and actuates the multiplying devices as the item is typed. Another lever has a two-position shift, one position indicated for addition and the other position indicated for multiplication and controls the movement of the multiplicand carriage in which the registering elements are mounted. Other levers and operating devices are provided to co-operate with these two control-levers, and it is obvious that the manipulation of such a machine with its multiplicity of manually-settable controlling elements that co-operate in varying combinations to produce different results, presents operational problems that only an expert typist can master.

One feature of my present invention is to provide means whereby some of the most frequently used manipulations of the controlling elements may be automatically effected by the letter-spacing movement of the carriage as the typing on the work-sheet proceeds, and without the exercise of care or judgment upon the part of the operator, as to where a computing operation is to be registered, and much time, annoyance, mental concentration and liability to errors will be saved the operator.

Another feature includes manually-operated controls for a plurality of computing registers, and for the typewriter numeral-keys, with an automatic carriage-control to co-operate therewith and enable the operator to employ either form of manipulation at will; a manual manipulation being particularly useful where special printed forms are employed that are only infrequently used and the preparation and employment of the automatic control is not desirable.

Another feature includes mechanically-operated zone-determining and state-controlling means removably mounted upon the carriage as a unit and having characteristics that predetermine the activities of the typewriter numeral-keys, as to whether they shall be operative to type in the usual manner or to type and simultaneously condition the mulplying devices to multiply by the digits of the typed and registered items, or whether the computation entered into each totalizer shall be one of addition, subtraction or multiplication, and to also determine the location and the sequence in which a totalizer shall become active. Such a controlling means may include a set-up fixture having a series of actuating cams thereon positioned and timed to the computing characteristics of the blank form to be typed upon. Every change in the blank form requires a corresponding change in the control-plate, and the changing from one work-form to another work-form, instead of involving a complicated change in the manual manipulation of the register or key controls, requires only the substitution of a plate that carries, as a unit, the mechanical equivalent of the computing characteristics associated with the new work-form. Thus, after the first set-up of the cams on the plate to the computing requirements of a work-form, a permanent control is provided for the keys and totalizers that can be instantly removed from or attached to the carriage of the typewriting machine, said unit having a location scale aligned with the typewriter-scale and having transverse lines, to guide in assembling the actuating cam positioned thereon, to conform to the computing characteristics of the blank form to be typed upon.

Another feature provides that the carriage, in moving from initial "0" scale position, will first automatically position the mechanical controlling devices in effective position, so that the cam-levers for the controlling devices will be subsequently operated by such cams on the plate as are predetermined by the computations required during the continuous movement of the carriage for a line of print.

Still another feature provides that the mechanical shift-controls are restored by the line-spacing mechanism of the typewriter-carriage, and the operation of line-spacing the platen at any letter-space position of the carriage will reset the mechanical controls to ineffective positions, and, during the subsequent return movement of the carriage to normal or "0" scale position by the line-spacing lever, the mechanical controls are cleared from the path of the cams on the carriage-driven control-plate.

Other features and advantages will hereinafter appear.

In the accompanying drawings,

Figure 1 is a side elevation of my improved typewriting and computing machine, showing the typing element mounted upon a base that supports the machine in common with a computing machine positioned at the rear of the typewriter. The computing machine has certain central sections broken away, and portions of the base-section under the typewriter are also broken away, to expose some of the operative parts and connections within.

Figure 2 is a detached sectional view, showing in detail the special multiplying keys and their immediate connections.

Figure 3 is a view similar to Figure 2, illustrating in detail the operating bar and its immediate connection.

Figure 8 is a front view, showing the parts of Figure 6 on a reduced scale, with the rock-shafts extended upwardly therefrom to the state-setting devices of the two lower totalizers. The upper section of the computer-frame, that may include other totalizers, is broken away.

Figure 9 is a detailed view of a spring-pressed detent to hold a totalizer in either one of three shift positions.

Figure 10 is a side view of the parts shown in Figure 9.

Figure 11 is a view of the left end of an Underwood typewriter-carriage, showing the control cam-plate mounted thereon in operative relation to the control-levers operated by the cams, and showing the connections from the line-space lever to the devices on the cam-plate that are actuated to restore the controlling devices to inoperative position subsequent to a line-spacing operation.

Figure 12 is a cross-section through the cam-plate, showing in detail the construction and the manner of removably securing said plate to the carriage of the typewriter.

Figures 13 and 14 are detailed views, showing two methods of forming or attaching the camming elements to the cam-plate.

Figure 15 shows a cam-plate removed from the machine with scale-graduations thereon, to assist in locating the cam-positions from a platen-scale reading, and also longitudinal lines which assign cam-positions to vertical planes that align with the cam-actuated control-levers.

Figure 16 is a top view of Figure 15 with two of the control-levers in operative relation therewith.

Figure 17 is a diagrammatic view, showing the control-levers in operative position and the connections therefrom to one of the totalizers that is set to a neutral or inoperative position relative to the operating rack-bars.

Figure 18 is a fragmentary view of Figure 17, showing the totalizer-pinions shifted to the right of Figure 17, where the transmission from the racks will function to add according to the predetermined state of the totalizer.

Figure 19 is a view similar to Figure 18, but the totalizer-pinions are shifted to the left of Figure 17, and the operating racks will rotate the pinions to subtract or "clear" as predetermined by the set-up state of the totalizer.

Figure 20 is a progressive diagrammatic view, showing the relative positions of the controlling levers as they are successively actuated by the cam-elements moving in unison with the carriage during the letter-space movement of the carriage for making a single-line typed entry involving a computation in multiplication.

Figure 4:
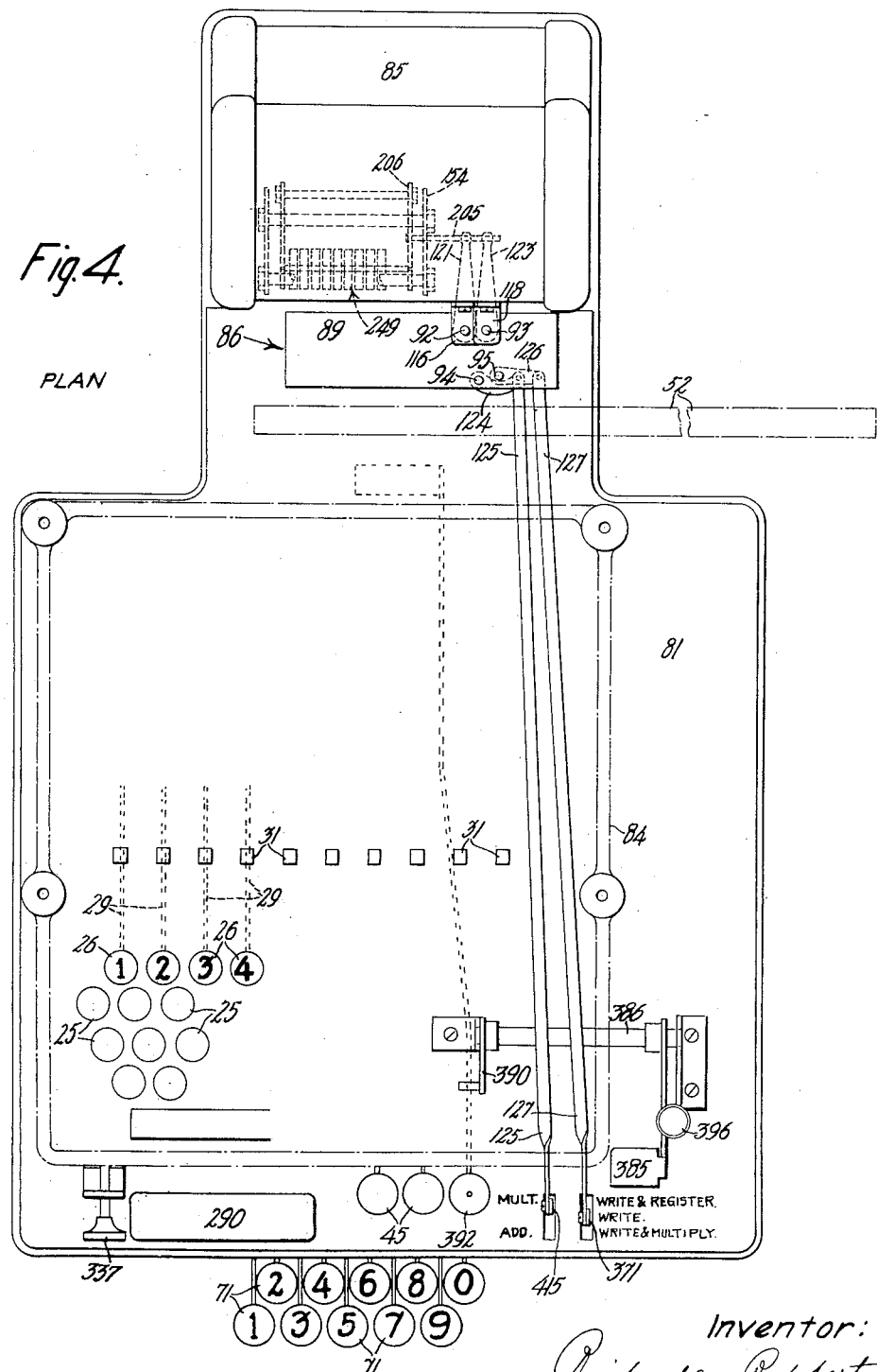
Figure 4 is a plan view of the base for the typewriter, outlined in dot-and-dash lines, and the various control-keys and connections in operative relation to each other.

As the present invention is an improvement on my prior patent, referred to above, by providing an automatic-operation control in addition to the manual control in the prior structure, and as all the operative parts of the prior structure remain intact, only the prior manually-operable parts in the older structure and their intermediate connections are shown, with new connections thereto that provide for this automatic control. Where these original parts are shown, they will be given the same numeral of reference as given for the same parts in said patent, and owing to the complicated nature of the parts operated by the control-elements; and the multiplicity of interlocking connections to the register set-up devices, a brief description of the functions performed by each one of these manually-operative controlling means for the keys and totalizers will be given.

In my prior patent, shifting the lever 371 to the "write" position, the link 373 operates through the lever 374, to render the key-stems 31 inoperative to vibrate the camming levers 30, which actuate the conventionally represented item-register 18 through the link-arm 28 and the link-connections 27. In this position the character and the numeral keys may be manipulated in the usual manner without performing computations of any character.

In shifting this lever 371 rearwardly to the "write and register" position, operative connections are established with the item-registering devices, and the numeral-keys operate to set up values in the item-register movable step by step approximate letter-space distances, to expose a visual set-up of the numerals as they are typed, and simultaneously establish operative connections between product plates and actuating racks for the totalizers.

By a forward shift of the lever 371 to the "write and multiply" position, connections are established between each typewriter numeral-key, and the multiplying devices through the cam-levers 80 and links 79, to the levers 75. The levers 75 are also subject to actuation by the special multiplying keys 71, and the actuation of one of these levers 75 draws the respective link 83 forwardly and operates through connections, to reciprocate the product plates and transmit multiplying movements to the totalizer set in operative position. The operation of a key induces two reciprocating movements of the product plates, the first conveying movement to the totalizer-racks proportionate to the tens values, and the second proportionate to the units values of the part-products of the multiplication in operation.

One feature of the present invention provides for connections to the upper exposed end of the lever 371, so that the shifting thereof may be done manually, as heretofore, or automatically, by camming means carried by the carriage of the typewriter.

The control-lever 415 has a two-position shift, one position to "multiply" and a second position to "add." The shift of this control-lever 415 to the "multiply" position operates to draw the connection 416 forward and vibrate the two crank-arms 417 and 419 to raise connection 420 and establish connection between power-driven camming means and the back-space mechanism for the carriage containing the item-register to back-space this register one denominational unit of distance. This back-spacing movement of the item-register occurs after the tens values of a product has been delivered to certain totalizer-pinions, to thereby position said item-register so that operative relations with the product plates and the totalizer-pinions of the next lower decimal order than those previously in operative relation is established for the purpose of delivering the unit values of the part-products of the multiplication in operation. The shift of the lever 415 from the "multiply" position to the "add" position disengages the back-space mechanism for the item-register from the power-driven cam and said cam is rendered ineffective.

Another feature of the present invention provides that the lever 415 may be also manually operated as heretofore, or may be automatically controlled by the mechanical control-unit movable with the typewriter-carriage.

The numeral-keys of the typewriter print an item and simultaneously register the item in the item-register for a subsequent operation, such as "adding" or "subtracting" the item or for "multiplying" the item by another numeral. The operation of registering an item may also select multiplying devices corresponding to the item registered and connect them with the actuating rack for the totalizers, and the numeral-keys, after being properly connected, can be actuated to simultaneously print the multiplier and actuate the multiplying devices of corresponding numerals to multiply. The special multiplying keys 71 also actuate the multiplying devices, but do not print, and the operation of a key of either of these two sets of keys operates the main driving shaft, causing two actuations of the multiplying devices connected to the key actuated, to thereby effect two actuations of the product plates; the first actuation being proportionate to the tens values of the multiplication of the numerals typed, multiplied by the numerals set up in the item-register, and the second actuation being proportionate to the unit values of the multiplication of the numerals typed, multiplied by the numerals set up in the item-register. The individual movement of the item-members for registering the item is utilized to select such product plates as correspond to the numerals set up in the register, and the lateral movement of the item-members establishes operative connections for actuating the totalizers. The special tabulating key 385, the "item-register" escapement-key 396, the clear key 337 and the operating bar 290 are retained to co-operate with the present invention as manually-operable controlling members.

In the Underwood typewriting machine, character-keys 25 and numeral-keys 26 depress key-levers 29, to vibrate bell-cranks 32, which swing type-bars 33 to the printing-position against the front face of a platen 34. The platen 34 is rotatably mounted within a platen-frame 35 to have case-shift movements within a carriage 36 propelled in a letter-space direction by a spring-motor 37 on the frame connected to the carriage by a tape 38. To control the step-by-step movements of the carriage, a universal bar 39 is operated by the key-levers 29, to convey motion to carriage-feeding mechanism 40. The carriage is further provided with a stop-bar 41 and a plurality of column-stops 42 adjustably set thereon to co-operate within a column-field with denominational tabulating stops 43 housed within a suitable casing or frame 44, and operated by denominational tabulating keys 45 positioned at the front of the keyboard in the well-known Underwood manner.

The carriage 36, in its to-and-fro movements, travels upon a rear guide-rod 46 and a front guide-rod 47 secured to the machine-frame. The bearing for the carriage on the rod 46 includes two lugs 48 depending from the carriage-ends, and these lugs provide a support for one end of a pair of arms 49 (see Figure 11), which may be secured thereto in any suitable manner, and, in the present construction, are offset to pass over and clear the denominational tabulating stops 43. The free ends of these two arms are provided with a spring 50 secured to the under faces thereof, to extend downwardly therefrom where the free ends terminate in a detenting V-formation 51 (see Figure 12). These arms are arranged at each end of the carriage, and provide means to support a controlling fixture or plate, referred to as a unit 52.

This fixture 52 is preferably formed from a single piece of light sheet-metal forming a wall or plate 53, the free ends thereof being first bent at right angles to form end sections 54, and then bent inwardly at right angles to provide short sections 55 parallel with the wall 53 (see Figure 16). This fixture is designed to be detachably mounted upon and between the two arms 49, and held in a vertical unyielding position relative to any force applied at right angles to the face of the wall 53 from the rear, and adjusted to or removable from the arms 49, in a vertical direction. To this end, the arms 49 (see Figure 16) are slotted at 56, to receive the sections 55 of the fixture, and the ends of said arms engage with the wall 53, to prevent front or rearward displacement of the fixture as a unit. This connection between the arms 49 and the end of the fixture 52 is shown with an exaggerated looseness. In practice, however, there will be no loose connection between these members, but the parts will be adjusted for a sliding fit, to enable the fixture to be lifted freely to disengage it from the two arms.

Stop-studs 57 project inwardly from the end sections 54, to rest upon the arms 49 and arrest the downward movement of said fixture, and, to prevent accidental upward movement of the fixture from this adjusted position, the sections 55 are formed with a slot 58 positioned to interlock with the detent end 51 of the spring 50, to effectively hold the fixture in position with the studs 57 spring-pressed against the face of the arms 49 (see Figure 12). To stiffen the plate 53 to resist torsion, the upper and lower longitudinal edges thereof are bent at right angles to form lips, and the lower lip 59 provides a straight edge to bear against an anti-friction roller 60 mounted to rotate on a bracket 61 secured to the side face of the casing 44, to guide the lower end of the fixture 52 and prevent distortion thereof under pressure from the rear. The fixture, as described, is removably secured to the arms 49, and a finger-piece 62 is provided at each end of the fixture, to facilitate the removal of the fixture from the carriage as a unit. Each finger-piece 62 is formed with an ear 63 (Figure 12) to project from the face of the wall 53, to provide end bearings for a rock-shaft 64 extending longitudinally with the wall; and adjacent the face thereof. The shaft 64 carries a longitudinal tongue 65 having a length that is approximately equal to the distance between two of the ears 63, and thus prevents any undue endwise movement of the rock-shaft.

A line-space lever 66 is fulcrumed at 67, as by a screw passing through a hub-section 68. A pin 69 projects from a side of the hub 68, to enter an open slot 70 in the forward end of a connection 72, slidingly mounted on the carriage-frame 35 and upon studs 73 in the frame engaging within elongated slots 74 in the connection 72. The rear free end of this connection 72 is formed with an open vertical slot 76, to engage with a pin 77 on the end of a crank-arm 78 secured to the end of the rock-shaft 64, projecting outside of the ear 63 on the fixture 52 (see Figure 15).

A line-spacing movement of the lever 66 will rock the shaft 64, and the tongue 65 will swing rearwardly from the face of the wall 53, and, upon release of the line-space lever, the spring connected to the usual Underwood line-space slide (not shown) will restore said lever 66 to its stop-position against a lug 82 on the carriage-frame. It will be further noted that the line-space lever is mounted on the carriage, and the pin 77 is stationary relatively to a case-shift movement of the platen-frame, and, as the connection 72 is mounted upon said platen-frame and movable therewith up and down, the two slots 70 and 76, in the connection 72, provide for this case-shifting movement without disturbing the operative transmission between the two pins 69 and 77.

Figure 5:
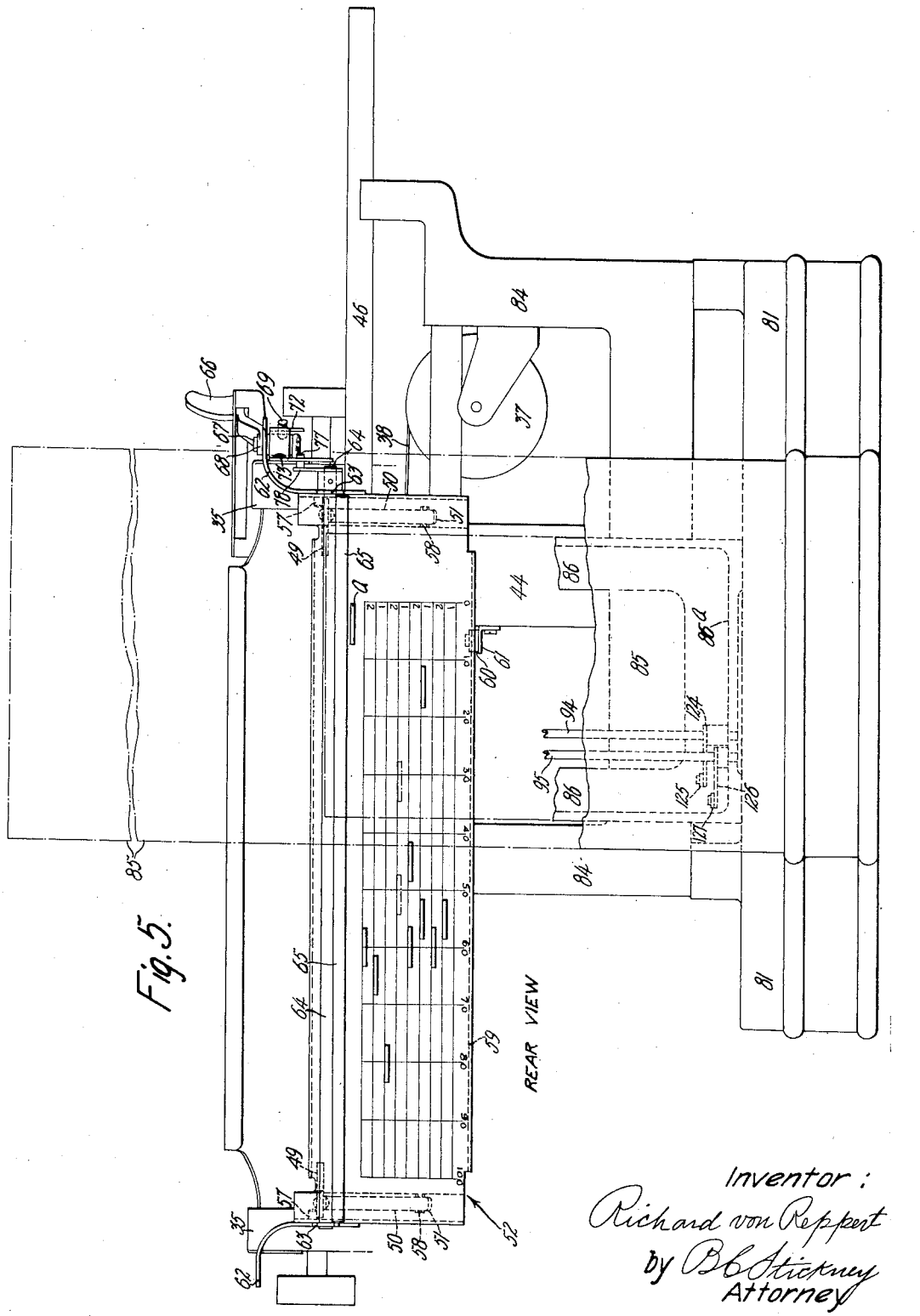
Figure 5 is a rear elevation of the base and the typewriter, with the upper section of the computing machine broken away, and the automatic control cam-plate mounted at the rear of the typewriter-platen-carriage in operative position.

Referring to Figures 5, 11 and 15, the outer face of the wall 53 of the control-plate 52 is provided with a series of triangular cams, and these cams may be separate units detachably mounted on the face of the plate, as shown in Figure 13, or formed with a combination shearing-and-forming die from the metal of the plate 53, as illustrated in Figure 14. The detachable cams are made of flat stock with two tongues to fit into perforations in the plate 52 and are held to the plate by screws. With the detachable cams, a change of the "set-up" can be readily made without tool-equipment.

These cams are distributed over the face of the plate 53 in vertical and horizontal planes. The vertical planes may be read from a convenient scale, as shown, that is timed to the scale on the carriage relative to the printing position of the types. The width of the plate may be divided into parallel planes indicated by lines scratched longitudinally of the plate, to indicate longitudinal parallel planes aligned to the fixed planes of co-operating elements to be operated by said cams, as will presently appear.

At Figure 15, beginning at the scale-position thereof, the first cam which becomes operative is indicated as $a$. These cams become operative singly or in unison, as predetermined by the characteristics of the form of the work-sheet, and are positioned to the longitudinal lines, usually in pairs, one cam of the pair operating to set, and the companion cam operating to restore a mechanism, presently to appear.

Figure 6:
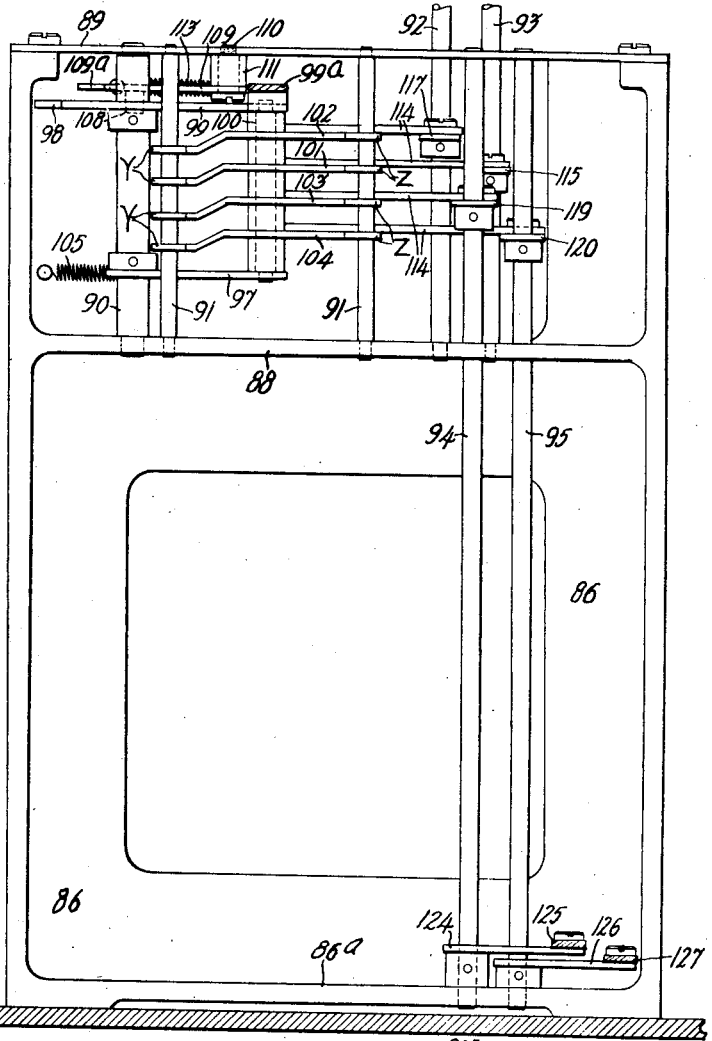
Figure 6 is an enlarged front elevation of a frame mounted on the base-frame and positioned between the rear of the typewriter and the front of the computing machine, to house a plurality of control-levers operated by the control cam-plate on the carriage, to transmit vibratory movements to the rock-shafts that actuate the various controls.

As shown in Figures 1, 4 and 8, a base-section 81 supports the typewriting machine 84 at the forward end and the vertical section 85 of the computing machine at the rear end of the base, and, between the typewriting and computing machines, a vertically-disposed frame or casing 86 of the computing controls is secured to said base-section as by screws 87. This frame 86 may be open on the side facing the typewriting machine formed with a horizontal partition-wall 88, and provided with a cover-plate 89 removably secured to the top of the frame. Said wall 88 and plate 89 provide pivotal bearings for a vertically-disposed rock-shaft 90, two stop-rods 91, the lower ends of two rock-shafts 92 and 93, and the upper ends of two rock-shafts 94 and 95, as best shown in Figure 6.

The lower end of the rock-shaft 90 is provided with a bell-crank lever, which includes crank-arm 96 and a pivot-arm 97 which forms the lower member of a rocking frame, and a second bell-crank lever is carried by the upper end of the shaft 90, and includes a cam-end 98 and a pivot-arm 99, which forms the upper member of the rocking frame. The pivot-arms 97 and 99 are joined together at their free ends in parallel relation by a tie-rod 100, and upon this rod a series of three-armed bell-crank control-levers 101, 102, 103 and 104 are mounted; each bell-crank lever being provided with suitable hub-sections to properly guide the swinging movement thereof, and also to uniformly space said levers on the rod 100. Each lever 101 to 104 includes a rearwardly-extending arm $x$ and two laterally-extending arms $y$ and $z$ arranged at approximately right angles to the arm $x$. The longitudinal arms $y$ and $z$ terminate in cam-faces at the front edge and stop-faces at the rear edge; and the stop-faces normally engage with the stop-rods 91 under the tension of a spring 105, connecting the arm 96 of the rocking frame to a stud 106 of the frame. The tension of this spring 105 is sufficient to hold the rocking frame and the series of bell-crank levers as a unit at a normal position against the two stop-rods 91.

Figure 7:
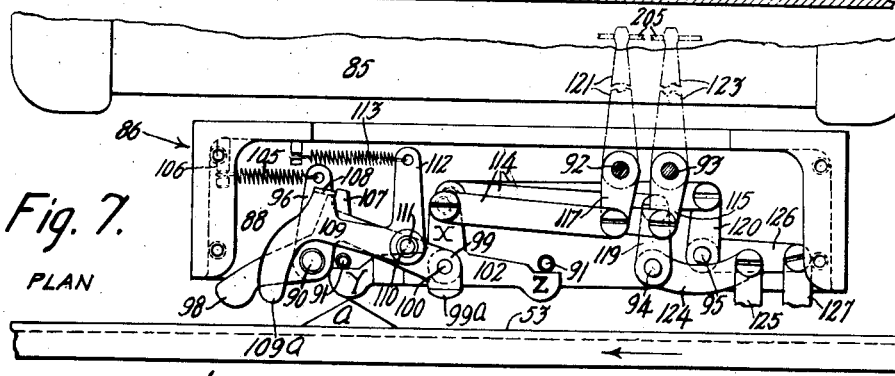
Figure 7 is a plan view of Figure 6, with the cover-plate removed, and shows the operative relation of the levers with a section of a cam-bearing control-plate that is movable with the typewriter-carriage.

Figure 7 shows the normal relative position of the cam-end 98 to the cam $a$ on the control fixture 52. In this figure, it is apparent that when said fixture 52 moves with the carriage 36 in the direction of the arrow, the cam $a$ will actuate the cam-end 98, to vibrate the rocking frame or carrier for the bell-cranks and move the whole series of bell-cranks 101 to 104 from the stop position against the rods 91 to the position of Figure 17, where the arms $y$ and $z$ will lie in a plane to be operated by other cams mounted upon said fixture 52. It is a purpose of the present invention to vibrate the rocking frame at the initial leftward movement of the carriage, and maintain the series of bell-cranks in operative relation to the cams on the fixture 52 through the letter-spacing movement of the carriage for a single-line entry. To this end, the arm 99 of the rocking frame has a rear extension 107, which is notched to interlock with a bent-over ear 108 of a latch 109 fulcrumed upon a pivot-screw 110, threaded into the cover-plate 89; said latch having a spacing hub 111 to align the latch at the side of the bell-crank lever 98—99. This latch 109 curves around the rock-shaft 90 to terminate in a round nose 109$^a$; and also includes an arm 112, to which is connected a spring 113 secured to the frame. The normal relation of the latch 109 to the rocking frame is that shown in Figure 7, and when the cam $a$ shifts the cam-end 98 of the rocking frame, the notch in the extension 107 will be withdrawn from the ear 108, and the latch 109, under the impulse of the spring 113, will cause the edge of said ear 108 to move along the adjacent edge of the extension 107, and thus lock the rocking frame in its operative position relative to the cams on the fixture 52, as shown in Figure 16.

The arm 99 of the rocking frame terminates in an extension 99$^a$ bent upward and forward to come into horizontal alignment with the nose 109$^a$ of the latch 109, and the relation of these two parts is such that, when the latch 109 locks the rocking frame, the nose 109$^a$ will move toward the cam-fixture 52, and the extension 99$^a$ will be shifted toward said fixture also; and as both nose and ear are approximately in the same horizontal plane, the vibration of the rock-shaft 64, by the line-space lever, will cause the longitudinal tongue 65 to first engage the nose 109$^a$ to raise the ear 108 from this interlock with the extension 107, and then contact with the extension 99$^a$ of the lever 99, to vibrate the rocking frame back into normal position with all the ends $y$ and $z$ against the stop-rods 91. Upon release of the line-space lever, the spring 105 will maintain the rocking frame in its normal position, and with the release of the tongue 65 the latch 109 will drop into the notch of the extension 107.

From this detailed description, it will be understood that the rocking frame is released by an initial movement of the carriage for the commencement of a new line, and the cam-actuated bell-crank levers 101 to 104 are shifted into position to be operated by the cams on the detachable fixture 52, which travels with the carriage, and that at the end of the printed line the rocking frame is restored to shift the bell-crank levers thereon to inoperative position by a line-spacing movement and prior to the return movement of the carriage, to render the cams on the fixture inoperative during this carriage-return movement.

Referring to Figure 6, the cam-ends $y$ of the four bell-crank levers 101 to 104 are offset to throw them into a different plane from the cam-ends $z$. A cam on the fixture 52 that is aligned to actuate the end $z$ will pass the end $y$, and the latter will only respond to a cam on the fixture that is in horizontal alignment therewith, and hence a cam on the fixture that is positioned to actuate the end $y$ will idly pass the companion end $z$, and vice versa. A cam on the fixture positioned to actuate the end $y$ will transmit a movement to the arm $x$ in a direction to the right of Figure 7, and the other cam on the fixture positioned to actuate the end $z$ will transmit a movement to the arm $x$ in the opposite direction, or to the left of the neutral position, shown in this figure. Hence, with the three-armed bell-cranks described having offset cam-ends $y$ and $z$ actuated by a pair of cams on the fixture 52, the motion-transmitting arms $x$ thereof may be vibrated at either side of a central normal position, and the interval of time between such vibrations will be predetermined by the distance separating the cams on the fixture; or an arm $x$ may be vibrated in one direction by a cam on the fixture, and, instead of restoring the arm to its normal position by a companion cam, the arm may be restored at the line-end position by the line-spacing movement, when the rocking tongue 65 restores all the levers in unison. Thus, by setting up a series of cams on the fixture 52 to relative vertical and horizontal alignments predetermined by a scale-reading of the work-sheet on the platen, the motion-transmitting arms $x$ of the four bell-cranks 101 to 104 may be automatically brought into action in many varying combinations, to operate singly or in combinations of two or more, or not operate at all, to condition the computing mechanisms.

As shown in Figure 7, the two cam-ends $y$ and $z$ are uniformly the same for the four bell-cranks 101 to 104, but the crank-arms $x$ may vary in length, to vary the transmission of movement therefrom as may be required to operate individual mechanisms. The crank-arm $x$ of the bell-crank lever 101 has a pivoted link-connection 114 to a short crank-arm 115 secured to the rock-shaft 93, having a pivotal bearing at the lower end in the partition-wall 88, and at the upper end in a bracket 118 secured to the front wall of the computer-frame 85 (see Figure 8). The arm $x$ of the bell-crank 102 has a link similar to 114, which connects with a crank-arm 117 secured to the rock-shaft 92, which also has a pivotal bearing within the wall 88 at the lower end, and the upper end pivoted to a bracket 116 also secured to the front wall of the frame 85. The arm $x$ of the bell-crank 103 has the link-connection 114 to a crank-arm 119 fixed to the vertical rock-shaft 94, which takes an end bearing within the plate 89 and a lower bearing within the base 86$^a$ of the frame 86; and the arm $x$ of the bell-crank 104 has the link-connection 114 to a crank-arm 120 secured to the rock-shaft 95, and, like the shaft 94, has a bearing within the enclosing frame-members 88 and 86$^a$.

The upper end of the shaft 92 has an arm 121 (see Figures 7, 9 and 10), which passes through a clearance hole in the front face of the frame 85, and the inner end thereof engages within a slot 122 in an arm 205 secured to the side wall 206 of a totalizer-frame 245 and formed with detent-notches on the upper edge to engage with a spring-pressed latch 207 pivoted on the frame-plate 154. This latter construction is shown and described in the prior patent referred to, where the middle detent-stop is a neutral position, and, by moving the register as a whole to the right or left hand, transmission to the totalizer-driving gears may be in one direction to add, or in the reverse direction to subtract. This action is shown diagrammatically at Figures 17, 18 and 19, and such parts that are old are given the same reference numerals as in the prior patent. The register-wheels 245$^a$ and the connections driven by the gears 231 are mounted within a carrier to slide endwise in either direction, to shift the gears 231 into or out of operative relation with the driving racks 152$^a$ and 152$^b$ that are reciprocal in opposite directions. In the positions assumed in Figure 17, the rocking frame is set in operative position and the cam $h$ thereon is about to engage with the cam-end $z$ of the bell-crank 102. Further movement of the fixture 52 in the direction of the arrow will rock the cam-end $z$ to vibrate the arm $x$ and draw the connection 114 leftwardly, to rock the arm 117, shaft 92 and arm 121, which is in interlock with the arm 205 on the totalizer-frame 245, and the totalizer will be shifted rightwardly to the position of Figure 18, where the operating rack-bars 152$^b$ for subtraction are inoperative to the gears 231, and the racks 152$^a$ are operative to perform an adding function. Similarly, if a cam $e$ moves to the dotted position to engage with the cam-end $y$, the direction of transmission will be reversed for the arm 121, and the register will be shifted leftwardly to the position of Figure 19, where the adding racks 152$^a$ become inoperative to engage with the gears 231, and the subtraction rack-bars will co-operate with the gears to register a computation involving a subtraction operation. As the bell-cranks 101 to 104 are all restored at the line-end position where a line-space movement takes place, it will be understood that the restoration of the bell-cranks will also restore any active totalizer to the normal inoperative position of Figure 17. Should it be desirable to restore an active totalizer to an inactive position, a cam, having a working height of lesser degree as indicated at $c$, Figure 16, will restore a bell-crank and its connection to a normal position during the natural step-by-step movement of the carriage in a letter-space direction. Hence, a totalizer may become active at the initial movement of the carriage to record an item, then be rendered inactive, and subsequently become active at another position of the line to be typed.

The rock-shaft 93 rises to a higher position on the frame 85 to operate a totalizer or register 249 immediately over the totalizer 245 just described, and carries an arm 123 which enters a hole in the front of the frame 85, to engage the arm 205 on the second register operated by the arm, in a manner similar to the operation just described. And, while the operation is descriptive of adding or subtracting functions for the registers, it will be apparent that by the reversal of the order of the numerals on the register-wheels the same mechanism with the same operations may be employed to register a computation in either division or multiplication, as fully described in my prior patent.

Referring to Figures 1, 4 and 6, as already described, the bell-cranks 103 and 104 rock the two shafts 94 and 95, respectively. The shaft 94 at the lower end carries a crank-arm 124, and the end is pivotally connected by a link 125 to the upper end of the control-lever 415, and the shaft 95 carries a crank-arm 126 at its lower end, which is pivotally connected to a long link 127, which extends forwardly over the top of the base 81 to the front thereof, where the end is pivotally connected to the control-lever 371. It will be noted at this time that the lever 371 at Figure 4 is shown at a middle shift position indicated by the word "write", where its operating bell-crank 104 is positioned at a normal position where neither cam-end $y$ or $z$ can be operated by a cam on the fixture; the cam-end $z$ being operative to shift the lever to "write and register," and the cam-end $y$ to shift the lever to the "write and multiply" position.

The control-lever 415, however, has no intermediate position. The mechanism controlled by the lever is always operative to enter into an adding or multiplying computation, hence when the bell-crank 103 is in normal position the lever 415 is set to the multiplying position, and when the cam-end *y* thereon is cam-actuated, said lever 415 will be shifted to the "addition" position, and to again shift this lever back for multiplication requires a low cam similar to *c* of Figure 16, to engage the cam-end *z* and restore the arm *x* to a neutral position.

The operation of this combined typewriting and computing machine in billing such as the item "2075 bushels of #2 wheat at 1 65=3423 75", Figure 20, shows the cam-plate 52 with a cam "set-up" to conform to this type of bill. This view also shows, diagrammatically, the progressive positions assumed by the various controlling devices during the successive steps of writing and computing the above example. The successive steps are indicated as positions 1st to 6th, and the various controlling devices that are actuated during a step are shown separately at the end of that step. The first position shows the relation of the controlling devices to the cam-plate when the typewriter-carriage is in normal or right-hand position and the printing point of the typewriter is in alignment with the "0" of the scale, as shown.

With the typewriter-carriage in this position, the operator first operates the proper decimal-tabulating key to position the carriage to type the item "2075". During the tabulating movement of the carriage, the cam *a* on the cam-fixture 52, actuates the frame-lever 98—99 and sets all the mechanical controlling levers from ineffective positions, as shown in the first position, to effective positions, as shown in the second position. Practically simultaneously with the foregoing, the cam *b* actuates the upper cam-end *z* of the bell-crank 104, which controls the connection of the typewriter numeral-keys through the manually-operable lever 371, and shifts the lever to "write and register" position, in which said numeral-keys are connected to simultaneously type and set up the item in the item mechanism. The second position of Figure 20 shows the position of the bell-crank 104 at this phase of the example. The operator now operates the numeral-keys to type "2075 bushels of #2 wheat", and, after the item "2075" has been typed and during the letter-spacing movement of the carriage while typing the word "Bushels", the low cam *c* will actuate the cam-end *y* of the bell-crank 104 and set the bell-crank to normal position, in which the manually-operable lever 371 connected thereto is set to "write only" position, so that the operation of the "#" and "2" typewriter numeral-keys when typing the item "#2 wheat" does not influence the calculating devices. The position of the bell-crank 104 at this phase of the example is shown by the third position.

The operator will next operate the next proper decimal-tabulating key to position the typewriter-carriage to type the multiplier "1 65". During this tabulating movement of the carriage the cam *d* actuates the cam-end *y* of the bell-crank 104 to position the lever 371 in its third or "write and multiply" position, in which the numeral-keys are connected to simultaneously type and actuate multiplying devices; and the cam *e* actuates the cam-end *z* of the bell-crank 102 which controls the totalizer 245 and sets it in position to add. The positions of the bell-cranks 104 and 102 at this phase of the example are indicated by the fourth position of the diagram.

The operator now operates the numeral-keys to type the multiplier "1 65", and this operation causes the multiplication of "2075" by "1 65" to be run into the totalizer 245 and the product "3423 75" will be shown on the dials of the totalizer. The decimal-tabulating key is depressed to release and position the carriage to type the product total "3423 75". In the course of this tabulating movement of the carriage, the cam *f* actuates the cam-end *z* of the bell-crank 104 to set the machine to "write and register", and the cam *g* actuates the cam-end *y* of the bell-crank 103 to shift the lever 415 to "add" position. This phase is shown by the fifth position of the diagram.

The next operation is the typing of the product total "3423 75", and in the course of the letter-spacing movement of the carriage, the cam *h* will actuate the cam-end *y* of the bell-crank 102, to set the totalizer 245 to a "subtract" position, and the cam *i* will actuate the cam-end *z* of the bell-crank 101, to set the totalizer 249 to an "add" position. This phase of the example is shown by the sixth position of the diagram.

The operator now depresses the "1" multiplying key, and this operation causes the product total to be added into the totalizer 249 and to be subtracted out of the totalizer 245. The operating bar 290 is next operated to clear and reset the item-register, and the typewriter-carriage is then reset to normal position. To reset the typewriter-carriage, the line-space lever 66 is actuated, and will first actuate the paper-feed device and reset the mechanical controlling devices to normal or ineffective position, and then said carriage is moved to the righthand or starting position. As stated hereinbefore, the resetting movement of the controlling devices to normal positions also resets the devices controlled thereby to normal positions, so that the totalizers 245 and 249 are reset to neutral positions, the lever 371 is set to neutral or "write" position, and the lever 415 is set to normal or "multiply" position.

It will be understood that the setting of the cams on the plate 52 in Figure 20 is diagrammatic, and that they are approximately timed to each other, to avoid confusion.

It will be noted from the foregoing description that the relative disposition of the cams on the plate 52 may be varied, to cover a great variety of the computing operations; that the four controlling levers 101, 102, 103, 104 may be increased in number, and, with the increase in the number of these levers, the number of totalizers employed may also be increased; that the manual set-control of complicated computing operations is superceded by a control that is automatic through mechanical means co-operating with the usual carriage-feed movement in typing; that the change from one work-sheet form requiring certain combinations of computations may be instantly changed to another form by substituting a new cam-plate for the typewriter carriage, which changes the order or sequence of the computations without individual adjustments of the several controlling mechanisms; and that while the descriptive matter includes a train of mechanical devices to convey the carriage-movement or typing characteristics to computing devices, the invention is not limited to such mechanical operating means.

Variations may be resorted to within the scope of the invention, and portions of the improvements may be used without others.

Having thus described my invention, I claim:

1. In a calculating machine having typewriting devices including a carriage, a plurality of totalizing mechanisms normally disconnected, and controlling devices operative to connect and disconnect the totalizing mechanisms, said controlling devices being normally in inoperative positions, and shiftable bodily to operative positions wherein they may be actuated to connect and disconnect the totalizing mechanisms, means carried by the typewriter-carriage and effective during the normal feeding movement thereof, to shift and set the controlling devices to operative positions, and means carried by the typewriter-carriage and operative by effecting a reverse movement of the carriage, to reset the controlling devices to inoperative positions.

2. In a typewriting machine having a traveling carriage and a computing mechanism including a series of normally inoperative totalizers, a control-lever for each totalizer, said levers arranged in different planes, one over the other, so as to be selectively controllable by the carriage, and a controlling plate on the carriage having cams aligned to the planes of the control-levers to predetermine according to a computing schedule the carriage-position where each totalizer shall become operative to compute during the travel of the carriage.

3. In a typewriting machine having a traveling carriage, a computing mechanism including a series of normally inoperative totalizers, and a normally inoperative control-lever connected to each totalizer, a controlling plate on the carriage having a cam to first condition the control-levers to render said levers actuable, said plate also having other cams to actuate the control-levers to render their respective totalizers operative in predetermined order to compute according to a predetermined computing schedule during the normal travel of the carriage.

4. In a typewriting machine having a traveling carriage, a computing mechanism including a series of normally inoperative totalizers, and a normally inoperative control-lever connected to each totalizer, a controlling plate on the carriage having a cam to first condition the control-levers to render said levers actuable, said plate also having other cams to actuate the control-levers to render their respective totalizers operative in predetermined order to compute according to a predetermined computing schedule during the travel of the carriage, and means to restore the control-levers and the totalizers to inoperative positions at the end of each single line computation.

5. In a typewriting machine having a traveling carriage and a computing mechanism including a series of normally inoperative totalizers, a series of control-levers mounted in a carrier, so as to be shiftable from an inoperable position to an operable position, each lever being connected to a totalizer, and a controlling plate on the carriage having a cam to first shift the carrier to condition the control-levers to be operable, and other cams to subsequently actuate the control-levers to render their respective totalizers operative, in a predetermined order, to compute, according to a predetermined schedule, during the travel of the carriage.

6. In a typewriting machine having a traveling carriage and a computing mechanism including a series of normally inoperative totalizers, a series of control-levers mounted in a carrier, so as to be shiftable from an inoperable position to an operable position, each lever being connected to a totalizer, a controlling plate on the carriage having a cam to first shift the carrier to condition the control-levers to be operable, and other cams to subsequently actuate the control-levers to render their respective totalizers operative, in a predetermined order, to compute, according to a predetermined schedule, during the travel of the carriage, and means operative at the end of each line computation to vibrate the carrier and restore the control-levers to inoperative positions.

7. In a typewriting machine having a traveling carriage and a computing mechanism including a series of normally inoperative totalizers, a series of control-levers mounted in a carrier, so as to be shiftable from an inoperable position to an operable position, each lever being connected to a totalizer, a controlling plate on the carriage having a cam to first shift the carrier to condition the control-levers to be operative and the other cams to subsequently actuate the control-levers to render their respective totalizers operative, in a predetermined order, to compute, according to a predetermined schedule, during the travel of the carriage, and line-spacing mechanism having connections to vibrate the carrier and restore the control-levers to inoperative positions prior to the restoring movement of the carriage.

8. In a typewriting machine having a traveling carriage, numeral typing keys, a computing mechanism, and a manually operable control lever shiftable to three set-positions, to condition the computing mechanism to type without computing, to type and register, or to type and multiply, at will, a bell-crank adjacent the rear of the carriage, settable to three positions, a vertical shaft having link connections to the bell-crank and to the control-lever, and a controlling plate on the carriage having cams to engage the bell-crank and automatically shift the control-lever to any one of three positions predetermined by a computing plan.

9. In a typewriting machine having a traveling carriage, numeral typing keys, a computing mechanism, and a manually operable control-lever for the computing mechanism, a bell-crank adjacent the rear of the carriage, settable to three stop-positions, connections between the bell-crank and the manually operable control-lever, and a controlling plate mounted upon the carriage and having cams variably disposed thereon to automatically actuate the bell-crank to set the control-lever to type and not compute, to type and register, or to type and multiply as predetermined by a computing plan.

10. In a typewriting machine having a traveling carriage and a computing mechanism, a series of control-levers to condition the computing mechanism for a computation, a carrier for the series of control-levers for shifting said levers from an inoperable to an operable position, said carrier spring pressed toward the inoperable position, locking means whereby said carrier is locked in position to render the control-levers operable, and means carried by the carriage to shift and lock the carrier and render the control-levers operable during the subsequent movement of the carriage to compute.

11. In a machine of the character described, having typewriting devices including a platen-carriage and a line-spacing mechanism, and a plurality of totalizing mechanisms normally disconnected therefrom, the combination with controlling devices to operatively connect the totalizing mechanisms selectively with the typewriting machine during the advance movement of the carriage in accordance with a predetermined plan, of means forming an operative and direct connection between the line-space mechanism and controlling devices whereby upon operation of said line-spacing mechanism in line-spacing the platen, the totalizing mechanisms are caused to be restored to their normal disconnected state for the commencement of a new line.

12. In a typewriting machine having a traveling carriage and computing devices including an accumulating totalizer arranged to be shifted from an inoperative position to one or the other of two operative positions by a two-way control lever to add or subtract, said lever being arranged so that it may be shifted bodily from an inoperable position in which it causes said totalizer to be inoperative, to an operable position wherein said lever may be shifted either way, the combination with said lever, of selective means, movable with the carriage, that become operable at any predetermined position of said carriage to first shift said lever into operable position and then actuate said lever either way for an additive or a subtractive operation, said lever being retractible to its inoperable position so that said means movable with the carriage will not be effective upon said lever in the return movement of said carriage.

13. In a typewriting machine having a traveling platen-carriage, line-spacing devices operable to line-space the platen, and a computing mechanism including a series of normally inoperative totalizers, the combination with connections actuated by the carriage movement to render the totalizers operative in a predetermined order during a single line computing movement of the carriage, of means forming a connection between said connections and the line-spacing devices and directly actuated by the line-spacing devices in line-spacing the platen to restore the totalizers to normally inoperative positions.

14. In a typewriting machine having a traveling carriage and a computing mechanism including a series of normally inoperative totalizers, a series of computing control levers arranged as a series in a vertical tier and parallel with the carriage travel for displacement by the carriage movement, and a controlling plate on the carriage having cams aligned, in the direction of carriage travel, with the several levers and distributed longitudinally of said plate, to predetermine the sequence of a plurality of computations resulting in a grand total during a continuous line travel of the carriage.

15. In a typewriting machine having a traveling carriage, numeral-typing keys, computing mechanism, including a register in which an item may be set up preparatory to computation of said item, said mechanism also including means for effecting the computation of said item in certain relation to a number, connecting means between the typewriting machine and computing mechanism, said connecting means conditionable to effect typing without computing, to effect typing of an item and simultaneously setting up said item in said register, or to effect computation of said item in relation to a number and typing said number, and a manually operable setting lever shiftable to three set positions to selectively condition said connecting means as aforesaid, the combination of means actuated by the carriage travel and connected to the manual control lever to automatically and successively move said lever to different positions during a continued movement of the carriage in typing.

16. In a typewriting machine having a traveling carriage, numeral-typing keys, a computing mechanism including a register in which an item may be set up preparatory to multiplication and also including a totalizer settable to ineffective, adding and subtracting positions, and a manually operable control lever for controlling connections between said keys and the computing mechanism, and settable to three positions, namely, for typing only, for typing and registering, or for typing and multiplying, a pair of bell-cranks disposed one over the other adjacent the rear of the carriage, and individually settable to three stop positions, one bell-crank having connections to set the totalizer to one of the three positions, and the other bell-crank having connections to the control lever, and a controlling plate mounted upon the carriage, having cams variably disposed thereon to automatically actuate one bell-crank to set a totalizer to add or subtract, and actuate the other bell-crank to automatically set the control lever to type only, to type and register, or to type and multiply, said bell-cranks being actuated in a certain order as predetermined by a computing plan associated with the writing of a line.

17. In a typewriting machine having a traveling carriage, numeral-typing keys, a computing mechanism, a pair of manually operable control levers for the computing mechanism, means operable by one lever to condition the computing mechanism to add or multiply, and other means operable by the other lever to condition the computing mechanism to type and register a number to be added or multiplied, or to type and multiply said number, the combination of a pair of bell-cranks adjacent the carriage, each bell-crank having connections to a control lever, and a controlling plate on the carriage having cams disposed thereon to engage each bell-crank and effect the shifting of a control lever in opposite directions at different points in the forward travel of the carriage, according to a predetermined computing plan.

18. In a typewriting machine having a traveling carriage and a computing mechanism including a normally inoperative totalizer, the combination with a control-lever for the totalizer rockable in reverse directions, of a controlling plate on the carriage having one cam operative to vibrate the control-lever in one direction to render the totalizer operative to compute, and a second cam, spaced from the first cam in the direction of carriage travel, to reversely rock the lever to render the totalizer inoperative.

19. In a typewriting machine having a traveling carriage and a computing mechanism including a series of normally inoperative totalizers, the combination with control-levers for the totalizers arranged in a vertical tier, for selective control by the carriage, of a controlling plate on the carriage having an individual cam aligned to each control-lever in the tier to render the associated totalizer operative to compute, said cams disposed on said plate to actuate said levers in a certain order according to a predetermined computing schedule.

20. In a typewriting machine having a traveling carriage and a computing mechanism; a series of control-levers individually connected to the computing mechanism to establish a computative state, said levers arranged in tiers adjacent the rear of the carriage, arms on the carriage, and a controlling unit demountably secured to the arms and having a series of cams, each cam positioned on the unit to engage a control-lever of the computing mechanism at a predetermined position during the normal run of the carriage.

21. In a typewriting machine having a traveling carriage and a computing mechanism; a series of control-levers individually connected to the computing mechanism to establish a computative state, said levers arranged in tiers adjacent the rear of the carriage, arms on the carriage, a controlling unit demountably secured to the arms and having a series of cams, each cam positioned on the unit to engage a control-lever of the computing mechanism at a predetermined position during the normal run of the carriage, and a track on said unit engageable with means stationary with the machine, to prevent displacement of the unit during the camming of the control-levers.

22. In a machine of the character described, having a plurality of totalizing mechanisms normally disconnected, typewriting devices including a traveling carriage, and a plurality of separate controlling devices for rendering each totalizing mechanism operative or inoperative to compute, said controlling devices having a retracted position where all the totalizing mechanisms are inoperative, the combination of means carried by the carriage and operable by its travel to first shift all of said controlling devices into operative relation with the carriage and then engage said devices selectively during a continuous advance movement of the carriage to successively render each totalizing mechanism operable to compute.

23. In a typewriting machine having a traveling carriage and a computing mechanism including a normally inoperative totalizer; a control-lever for said totalizer having two terminals offset from each other, in the direction of carriage travel, and a schedule unit on the carriage having two cams, each cam aligned to an offset terminal and both cams operable to alternately vibrate the control-lever in different directions to render the totalizer operative and inoperative to compute, during the continuous travel of the carriage in one direction.

24. In a typewriting machine having a traveling carriage and a computing mechanism including a normally inoperative totalizer, a control-lever for said totalizer movable between two operative positions to determine an additive or a subtractive state therefor, and a state-controlling plate on the carriage having a pair of cams spaced apart to become successively operable in the direction of carriage travel to vibrate the control-lever between the two operative positions, one cam vibrating the lever in a direction to add, and the other cam vibrating said lever in a reverse direction to subtract, said cams and levers co-operating in a certain order according to the spacing of the cams for a predetermined computing schedule.

25. In a typewriting machine having a traveling carriage and a computing mechanism having a totalizer normally inoperative; a control-lever normally not engageable by the carriage and having connecting means to enable the totalizer to compute, a rockable frame for supporting said lever, cams on the traveling carriage, a cam on said frame engageable by means on the traveling carriage to rock the frame and set the control-lever into position to be subsequently engaged by said cams on the carriage to render the totalizer operable to compute, and a detent-lever engageable with said frame and having means to lock the frame in a cam-rocked position for a computing interval.

26. In a typewriting machine having a traveling carriage and a computing mechanism having a totalizer normally inoperative; a control-lever normally not engageable by the carriage and having connected means to enable the totalizer to compute, a rockable frame for supporting said lever, cams on the carriage, a cam on said frame engageable by means on the traveling carriage to rock the frame and set the control-lever into position to be subsequently engaged by said cams on the carriage to render the totalizer operable, a detent-lever engageable with said frame and having means to lock the frame in its carriage-rocked position, and means mounted on the carriage and operable at will to vibrate the detent-lever to release the frame and enable the totalizer to be restored to its normal state.

27. In a typewriting machine having a traveling carriage with a line-space lever, a computing mechanism having a totalizer normally inoperative to compute, and a control-lever having connections to render the totalizer operable to compute, the combination of means on the carriage engageable with the control-lever to automatically condition the totalizer to compute during the travel of the carriage, and means connected to the line-space lever and operable thereby in line-spacing to engage the control-lever and restore the carriage-conditioned totalizer to a normal inoperative state.

28. In a typewriting machine having a traveling carriage and a computing mechanism including a plurality of normally inoperative totalizers, a plurality of levers, one lever for each totalizer, and each lever having controlling connections to render the totalizer operable to compute, a rockable frame supporting all the totalizer-control-levers at inoperative positions, and means on the carriage made operable by the travel thereof, to rock said frame and shift all the control-levers into positions to be subsequently engaged by other means on the carriage to render each totalizer operable to compute.

29. In a typewriting machine having a traveling carriage and a computing mechanism including a plurality of normally inoperative totalizers, a plurality of levers, one lever for each totalizer, and each lever having controlling connections to render the totalizer operable to compute, a rockable frame supporting all the totalizer-control-levers at inoperative positions, and means on the carriage made operable by the travel thereof, to rock said frame and shift all the control-levers into positions to be subsequently engaged by other means on the carriage to render each totalizer operable to compute, said other carriage means including cams distributed along said carriage, and each cam arranged to be individual to a control-lever during the run of the carriage.

30. In a typewriting machine having a traveling carriage, a computing mechanism including an item-registering mechanism and a multiplying mechanism, numeral-typing keys, and a lever manually shiftable to three positions and having co-operative means to enable the keys to type a numeral, type and register a numeral and type and multiply a numeral, the combination of an automatic control-lever adjacent the carriage and having a train of connections with the manual lever, and means mounted upon the carriage and to be moved into a succession of engagements with said automatic control-lever during the normal travel of the carriage to set the manual lever to the positions required.

31. In a typewriting machine having a traveling carriage, a computing mechanism including an item-registering mechanism and a multiplying mechanism, numeral-typing keys, and a lever manually shiftable to three positions and having co-operative means to enable the keys to type a numeral, type and register a numeral and type and multiply a numeral, the combination of an automatic control-lever adjacent the carriage and having a train of connections with the manual lever, and means mounted upon the carriage and to be moved into a succession of engagements with said automatic control-lever during the normal travel of the carriage to set the manual lever at any operative position, said automatic control-lever having two cammable arms, and said means on the carriage having cams engageable seriatim with said arms to cam the automatic lever for effecting required movements of the manual lever.

RICHARD von REPPERT.